(12) United States Patent
Liao et al.

(10) Patent No.: US 6,625,344 B2
(45) Date of Patent: Sep. 23, 2003

(54) OPTICAL SWITCH

(75) Inventors: Shang Chin Liao, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 41 days.

(21) Appl. No.: 10/033,336

(22) Filed: Dec. 26, 2001

(65) Prior Publication Data

US 2003/0048981 A1 Mar. 13, 2003

(30) Foreign Application Priority Data

Sep. 12, 2001 (TW) .................................... 90215720 U

(51) Int. Cl.$^7$ ................................................ G02B 6/26
(52) U.S. Cl. .............................. 385/18; 385/19; 385/16; 385/36
(58) Field of Search ............................. 385/15, 16, 17, 385/18, 36, 19

(56) References Cited

U.S. PATENT DOCUMENTS

| 4,303,303 | A | * | 12/1981 | Aoyama | ................. | 385/18 |
| 5,436,986 | A | * | 7/1995 | Tsai | ................. | 385/16 |
| 5,867,617 | A | * | 2/1999 | Pan et al. | ................. | 385/18 |
| 6,526,196 | B1 | * | 2/2003 | Li | ................. | 385/18 |

* cited by examiner

Primary Examiner—Hemang Sanghavi
Assistant Examiner—Eric Wong
(74) Attorney, Agent, or Firm—Wei Te Chung

(57) ABSTRACT

An optical switch (99) includes a base (10), two input ports (20, 40), two output ports (30, 50), a movable reflector assembly (60), a driving means (70) and a cover (80). The movable reflector assembly has a first reflector (61) with two outer reflecting surfaces (611, 612) and a second reflector (62) with two inner reflecting surfaces (621, 622). The light beams from the input ports propagate to the output ports by moving the movable reflector assembly up and down between a first position and a second position and switching the first reflector and the second reflector into the path of the light beams in turn.

19 Claims, 5 Drawing Sheets

OPTICAL SWITCH

BACKGROUND OF THE INVENTION

1. Field of the Invention

The present invention relates to an optical switch for use in optical fiber communication and optical network technology, and particularly to an optical switch having four reflecting surfaces.

2. Description of Related Art

Optical signals are commonly transmitted in optical fibers, which provide efficient light channels through which the optical signals can pass. Recently, optical fibers have been used in various fields, including telecommunications, where light passing through an optical fiber is used to convey either digital or analog information. Efficient switching of optical signals between individual fibers is necessary in most optical processing systems or networks to achieve the desired routing of the signals.

A typical switch has one or more light input port(s) and at least two light output ports for performing switching or logical operations to optical signals in a light transmitting line/system or in an integrated optical circuit. Factors for assessing the capability of an optical switch include low insertion loss (IL, <1 db), good isolation performance (>50 db), and fast switching speed (normally, tens of milliseconds).

Optical switches are divided into two types. One is mechanical type and the other is non-mechanical type. In principle, the mechanical type optical switches have a number of advantages over other forms of optical switches in such applications where switching speed is not critical. Mechanical type optical switches offer lower insertion losses, low cross-talk, and insensitivity to wavelength of light.

Conventional mechanical type optical switches come in two different designs: where the optical components move, and where the fibers move. Moving fiber switches involve the actual physical movement of one or more of the fibers to specific positions to accomplish the transmission of a beam of light from one fiber end to another fiber end under selected switching conditions. Moving optical component switches, on the other hand, include optical collimating lenses which expand the beam of light from the fibers, and then, using moving prisms or mirrors, reswitch the expanded beam as required by the switching process.

The moving fiber switches have a stringent tolerance requirement for the amount and direction of fiber movement. The tolerance is typically a small portion of the fiber core diameter for two fibers to precisely collimate to reduce loss. The fibers themselves are quite thin and may be subject to breakage if not properly protected. On the other hand, reinforcing the fibers with stiff protective sheaths makes fiber into alignment. Thus these moving fiber optical switches share a common problem of requiring high precision parts to obtain precise positioning control and low insertion loss. This results in high costs and complicates manufacture of the switches. Moreover, frequently moving fibers to and fro is apt to damage or even break the fibers. The switching speed of these moving fiber optical switches is also slow.

Conventional moving optical component switches have less stringent movement control tolerance requirements because of the collimating lenses.

A moving optical component switch, as disclosed in U.S. Pat. No. 5,436,986 and shown in FIG. 6, comprises a first and a second input fibers 101, 103, a first and a second output fibers 102, 104, and a driving device 304 and a movable reflector assembly 200. The movable reflector assembly 200 includes a movable block 203 and two reflectors 201, 202 assembled on the block 203. Each reflector has two reflecting surfaces for reflecting light beams from the input fibers 101, 103. The driving device 304 drives the movable reflector assembly 200 to move between a first position and a second position. When the movable reflector assembly 200 is displaced in the first position, light beams from the first and second input fibers 101, 103 are directly transmitted to the first and second output fibers 104, 102. When the movable reflector assembly 200 is displaced in the second position, the reflector 201 reflects off the light beams from the first input fiber 101 to the reflector 202, and the reflector 202 reflects off the light beams to the second output fiber 102; the reflector 202 reflects off the light beams from the second input fiber 103 to the reflector 201, and then the reflector 201 reflects off the light beams to the first output fiber 104.

In this mechanical optical switch, the light beams are reflected two times, which increases the insertion loss. Furthermore, each reflector has two reflecting surfaces fixed thereon for reflecting light beams from different input fibers, and four reflecting surfaces of the movable reflector assembly 200 are at the path of the light beams at the same time, so it is very difficult to adjust the positions of the fibers and the reflecting surfaces for precisely collimating light beams from the input fibers 101, 103 to the corresponding output fibers 102, 104.

For the above reasons, an improved optical switch which has high optical efficiency, is easy to align and does not require movement of the optical fibers themselves is desired.

SUMMARY OF THE INVENTION

An object of the present invention is to provide an optical switch which is easy to adjust and has a low insertion loss.

Another object of the present invention is to provide an optical switch which uses four reflecting surfaces as a switching element.

In accordance with one aspect of the present invention, an optical switch comprises two input ports, two output ports and a movable reflector assembly. The movable reflector assembly includes a first reflector and a second reflector and moves between a first position and a second position. The first reflector includes two reflecting surfaces, and the second reflector also includes two reflecting surfaces. The first input port is opposite to the second output port, and the second input port is parallel to the first output port. When the movable reflector assembly is in the first position, the first reflector is in the path of the light beams while the second reflector is out of the path of the light beams, the light beams from the first input port are reflected by one reflecting surface of the first reflector and enter the first output port, and the light beams from the second input port are reflected by the other reflecting surface of the first reflector and enter the second output port. When the movable reflector assembly is in the second position, the first reflector is out of the path of the light beams while the second reflector blocks the path of the light beams, the light beams from the first input port directly travel toward the second output port, and the light beams from the second input port are reflected twice by the two reflecting surfaces of the second reflector and enter the first output port.

The feature of the present invention is to move the first and second reflectors into the path of the light beams in turn and reduce the insertion loss and the difficulty of adjustment.

Other objects, advantages and novel features of the invention will become more apparent from the following detailed description when taken in conjunction with the accompanying drawings.

DETAILED DESCRIPTION OF THE INVENTION

Figure 1:
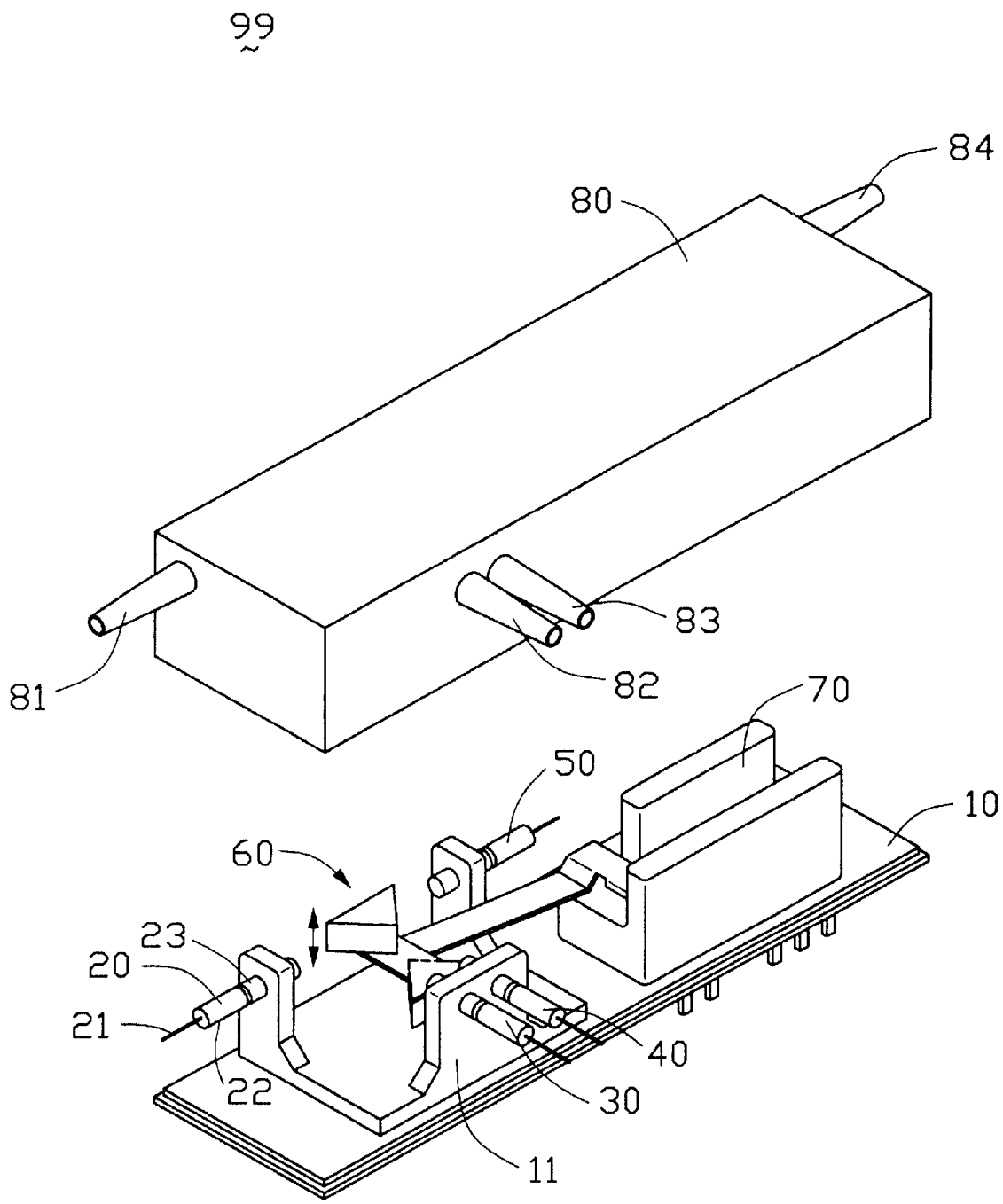
FIG. 1 is a perspective view of an optical switch in accordance with the present invention in a first position.
Figure 2:
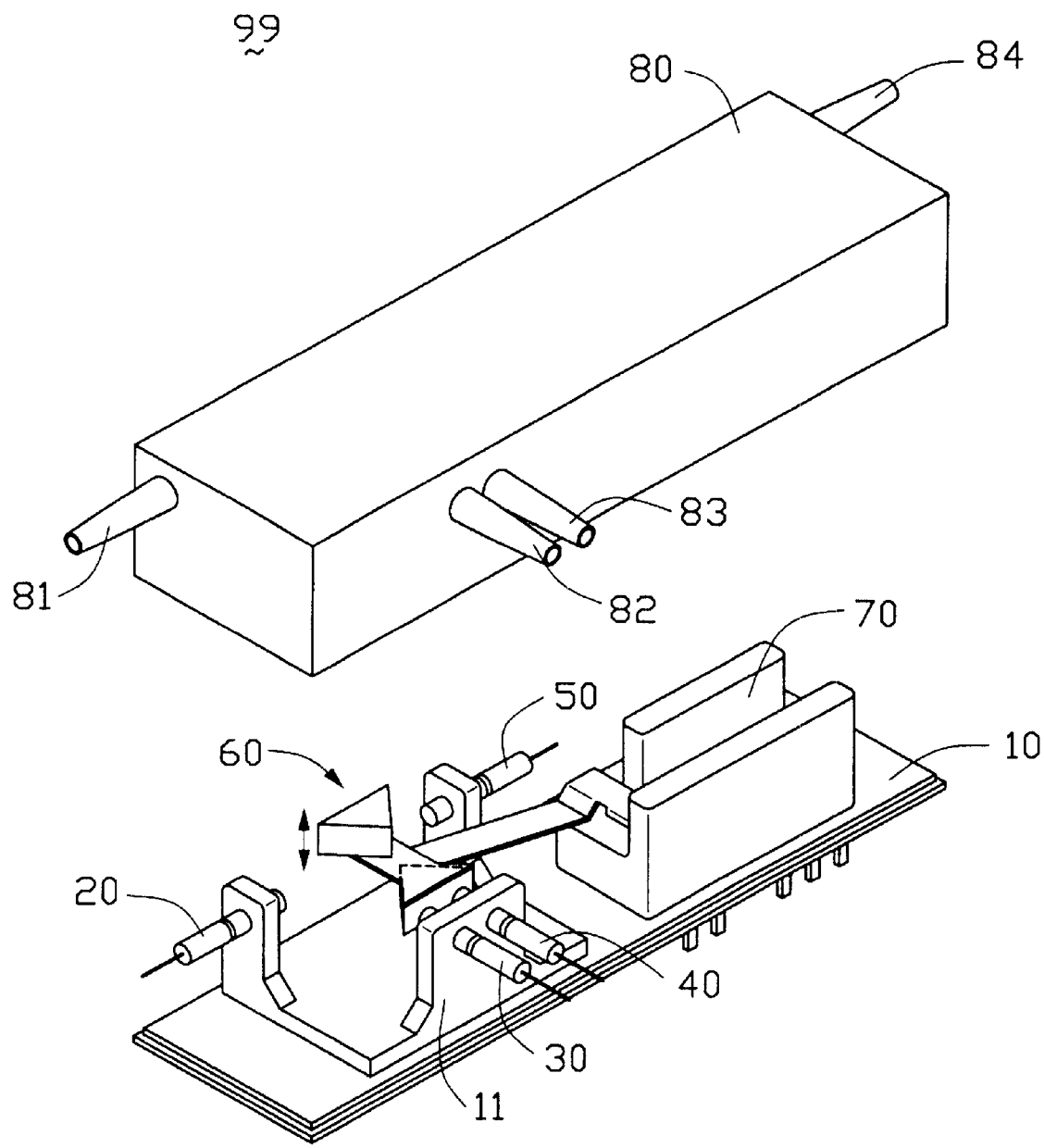
FIG. 2 is a perspective view of the optical switch in a second position.

As shown in FIGS. 1 and 2, an optical switch 99 in accordance with the present invention comprises a base 10, a first input port 20, a first output port 30, a second input port 40, a second output port 50, a movable reflector assembly 60, a driving means 70 and a cover 80.

The base 10 mounts a supporting element 11 for fixing the input and output ports 20, 30, 40, 50.

The first input port 20 has a first input fiber 21, a first ferrule 22 and a first optical collimating lens 23 (such as a quarter pitch GRIN lens). The first input fiber 21 is received and retained in the first ferrule 22, and the end face (not labeled) of the first ferrule 22 is adjacent to a corresponding face (not labeled) of the first GRIN lens 23. The first output port 30, the second input port 40 and the second output port 50 are similar to the first input port 20.

Figure 3:
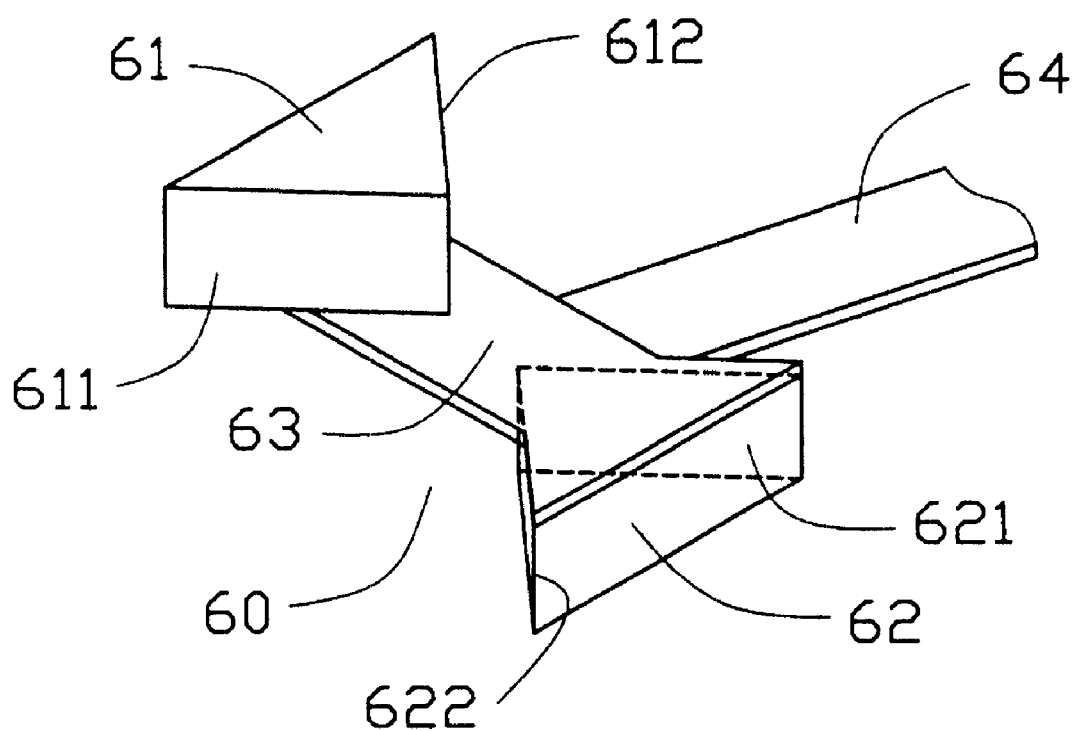
FIG. 3 is a perspective view of a movable reflector assembly of the optical switch.

The movable reflector assembly 60, as shown in FIG. 3, comprises a first reflector 61, a second reflector 62 and a block 63, which moves up and down between two positions. The first reflector 61 and the second reflector 62 are affixed to the block 63. In the preferred embodiment, each reflector is a triangular prism with two reflecting surfaces thereon. The first reflector 61 attaches to an upper end surface (not labeled) of the block 63 and comprises a first outer reflecting surface 611 and a second outer reflecting surface 612 arranged at an angle of 90°. The second reflector 62 attaches to a lower opposite end surface (not labeled) of the block 63 and comprises a first inner reflecting surface 621 and a second inner reflecting surface 622 arranged at an angle of 90°. The four reflecting surfaces 611, 612, 621, 622 are formed by coating with high reflectivity material (such as silver or gold) on the reflectors 61, 62.

The driving means 70 is realized by means of a motor or a relay, and comprises a movable arm 64 attached to the block 63 of the movable reflector assembly 60.

The cover 80 has four lead sections 81, 82, 83, 84 for protecting the corresponding fibers of the ports 20, 30, 40, 50.

In assembly, the base 10 and the c over 80 define an interior space therebetween for accommodating and mounting the input and output ports 20, 30, 40, 50, the movable reflector assembly 60 and the driving means 70 therein. The first input port 20 is opposite to the second output port 50, and the second input port 40 is parallel to the first output port 30. The first outer reflecting surface 611 is confronted with the first input port 20 and the first output port 30, and the second outer reflecting surface 612 is confronted with the second input port 40 and the second output port 50. The first inner reflecting surface 621 is confronted with the second input port 40, and the second inner reflecting surface 622 is confronted with the first output port 30.

Figure 4:
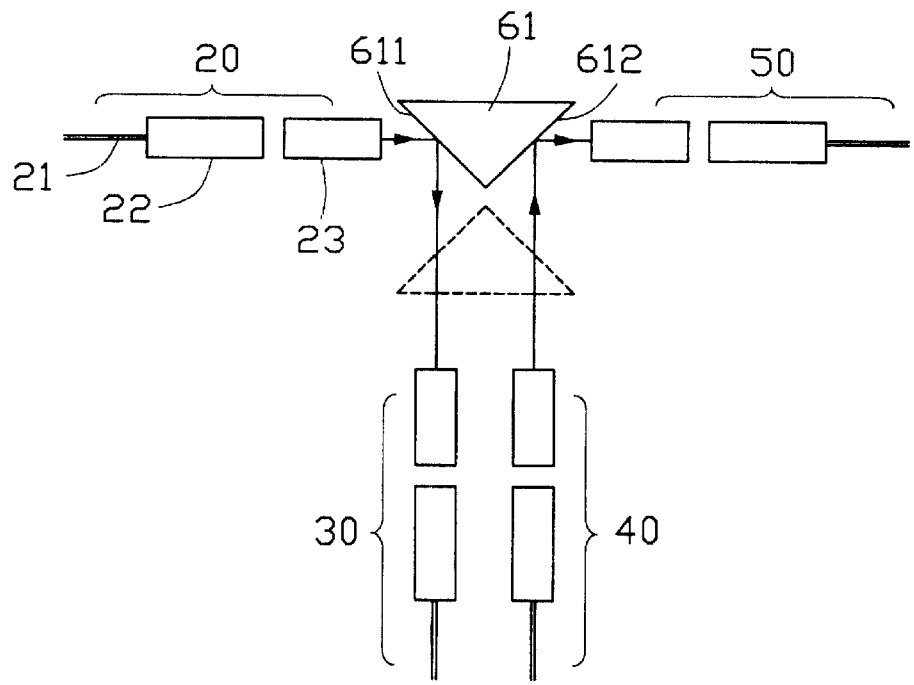
FIG. 4 is an essential optical path view of the optical switch in FIG. 1 in the first position.

As shown in FIG. 1, the movable reflector assembly 60 is positioned in the first position, wherein the first reflector 61 of the movable reflector assembly 60 blocks the path of the light beams, while the second reflector 62 is out of the path of the light beams. Also referring to FIG. 4, light beams from the first input fiber 21 are collimated to parallel light beams by the first GRIN lens 23 and hit the first outer reflecting surface 611 of the first reflector 61, whereupon they are reflected into the first output fiber (not labeled) of the first output port 30 through the second GRIN lens (not labeled). At the same time, the light beams from the second input fiber (not labeled) are collimated to parallel light beams by the third GRIN lens (not labeled) and hit the second outer reflecting surface 612 of the first reflector 61, whereupon they are reflected into the second output fiber (not labeled) of the second output port 50 through the fourth GRIN lens (not labeled).

Figure 5:
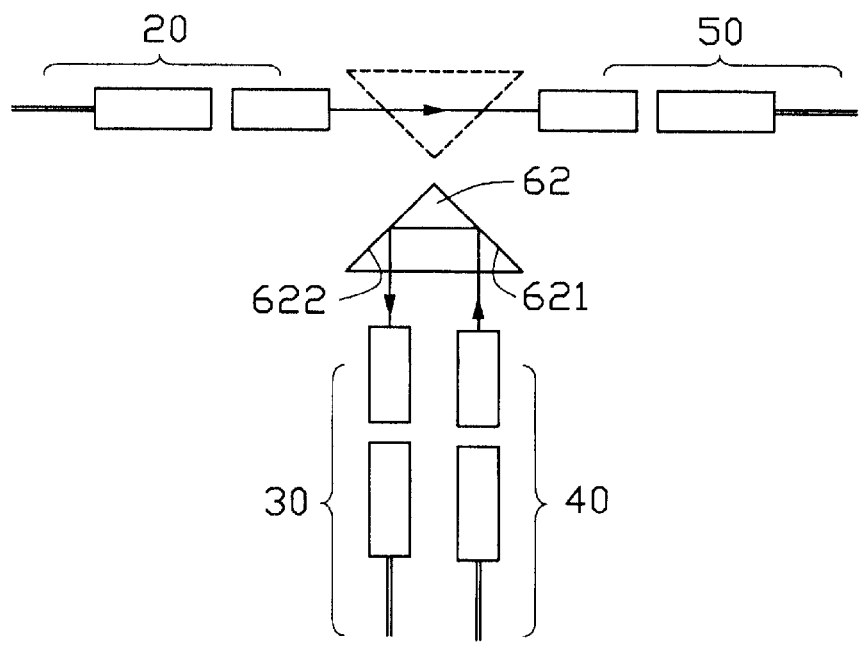
FIG. 5 is an essential optical path view of the optical switch in FIG. 2 in the second position.
Figure 6:
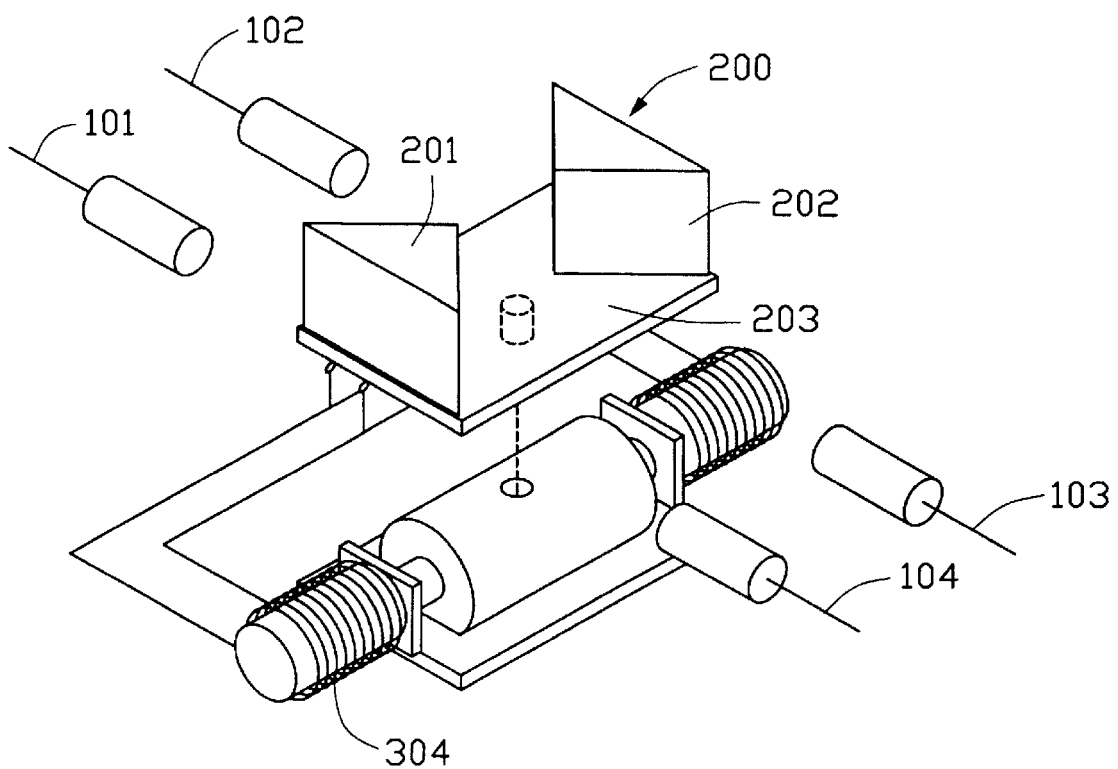
FIG. 6 is a perspective view of a conventional optical switch.

As shown in FIG. 2, the movable reflector assembly 60 moves to the second position under the action of the driving means 70 via the movable arm 64, the second reflector 62 turns to block the path of the light beams and the first reflector 61 is out. Also referring to FIG. 5, the light beams from the first input fiber 21 are transmitted through the first GRIN lens 23 and the fourth GRIN lens (not labeled) and then directly enter the second output fiber (not labeled) of the second output port 50. At the same time, the light beams from the second input fiber (not labeled) of the second input port 40 are transmitted through the third GRIN lens and reflected off by the first inner reflecting surface 621 and the second inner reflecting surface 622 and then enter the first output fiber (not labeled) of the first output port 30 through the second GRIN lens (not labeled).

Consequently, by controlling the moving direction of the movable reflector assembly 60 by means of the driving means 70 to move the first reflector 61 or the second reflector 62 into the path of the light beams, the direction of the transmission of the light beams from the input port 20, 40 can selectively enter the output port 30, 50.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, four mirrors can be used for replacing the two reflectors 61, 62 as the switching element.

What is claimed is:

1. An optical switch for switching light beams between input ports and output ports, comprising:

a base;

a first input port, a second input port, a first output port, and a second output port all supported by the base;

a movable reflector assembly comprising a first reflector and a second reflector being capable of moving up and down between a first position and a second position; and a driving means for switching the movable reflector assembly between the first position and the second position;

wherein, in the first position, the light beams propagate from the first input port to the first output port after being reflected by the first reflector and the light beams propagate from the second input port to the second output port after being reflected by the first reflector, and wherein, in the second position, the light beams from the first input port propagate directly to the second output port and the light beams from the second input port propagate to the first output port after being reflected two times by the second reflector.

2. The optical switch as claimed in claim 1, wherein light paths of the first input port and the second output port are collinear.

3. The optical switch as claimed in claim 1, wherein light paths of the first output port and the second input port are parallel.

4. The optical switch as claimed in claim 1, wherein the first reflector is constituted by a first mirror and a second mirror.

5. The optical switch as claimed in claim 4, wherein the first mirror and the second mirror are arranged at an angle.

6. The optical switch as claimed in claim 1, the second reflector is constituted by a third mirror and a fourth mirror.

7. The optical switch as claimed in claim 6, wherein the third mirror and the fourth mirror are arranged at an angle.

8. The optical switch as claimed in claim 1, wherein each reflector is a triangular prism having two reflecting surfaces.

9. The optical switch as claimed in claim 8, wherein the first reflector comprises a first outer reflecting surface and a second outer reflecting surface.

10. The optical switch as claimed in claim 9, wherein the first outer reflecting surface confronts with the first input port and the first output port, and the second outer reflecting surface confronts with the second input port and the second output port.

11. The optical switch as claimed in claim 9, wherein in the first position, the light beams from the first input port are reflected by the first outer reflecting surface and propagate to the first output port, and the light beams from the second input port are reflected by the second outer reflecting surface and propagate to the second output port.

12. The optical switch as claimed in claim 8, wherein the second reflector comprises a first inner reflecting surface and a second inner reflecting surface.

13. The optical switch as claimed in claim 12, wherein the first inner reflecting surface confronts with the second input port, and the second inner reflecting surface confronts with the first output port.

14. The optical switch as claimed in claim 12, wherein in the second position, the light beams from the first input port propagate directly to the second output port, and the light beams from the second input port are reflected by the first inner reflecting surface and the second inner reflecting surface and then propagate to the first output port.

15. The optical switch as claimed in claim 1, wherein the movable reflector assembly comprises a block for securing the two reflectors.

16. The optical switch as claimed in claim 15, wherein the first reflector attaches to an upper end surface of the block, and the second reflector attaches to a lower opposite end surface of the block.

17. The optical switch as claimed in claim 1, wherein the driving means comprises a movable arm attached to the block.

18. An optic switch comprising:

first and second input ports and first and second output ports, said first input port being aligned with said second output port to define a non-reflection light path therebetween, said first output port and said second input port being located on a same side of said non-reflection light path;

a first reflector moveable between said first input port and said second output port to intersect said non-reflection light path;

a second reflector moveable to interrupt light paths relating to said first output port and said second input port before said light paths intersect said non-reflection light path; wherein said first reflector and said second reflector mutually exclusively work with the corresponding light paths in the optic switch under a condition that when said first reflector is used and said second reflector is unused, light from the first input port is reflected by said first reflector and transmitted toward the first output port and light from the second input port is reflected by said first reflector and transmitted toward the second output port while when said second reflector is used and said first reflector is unused, said light from the first input port is transmitted without reflection toward said second output port along said non-reflection light path and the light from the second input port is reflected by the second reflector and transmitted toward said first output port.

19. An optic switch comprising:

first and second input ports and first and second output ports, said first input port being aligned with said second output port to define a non-reflection light path therebetween, said first output port and said second input port being located on a same side of said non-reflection light path;

a first reflector moveable between said first input port and said second output port to intersect said non-reflection light path;

a second reflector moveable to interrupt light paths relating to said first output port and said second input port before said light paths intersect said non-reflection light path; wherein said first reflector and said second reflector mutually exclusively work with the corresponding light paths in the optic switch under a condition that when said first reflector is used and said second reflector is unused, the first reflector reflects both light from the first input port and light from the second input port while when said second reflector is used and said first reflector is unused, said second reflector only reflects light from the second input port, not including light from the first input port.

* * * * *